Aug. 20, 1957 J. H. HAMMOND, JR 2,803,242
COOKING STOVE WITH RENEWABLE COOKING SURFACE
Filed March 13, 1953 4 Sheets-Sheet 1

INVENTOR.
JOHN HAYS HAMMOND, JR.
BY

INVENTOR.
JOHN HAYS HAMMOND, JR
BY

INVENTOR.
JOHN HAYS HAMMOND, JR.

United States Patent Office 2,803,242
Patented Aug. 20, 1957

2,803,242

COOKING STOVE WITH RENEWABLE COOKING SURFACE

John Hays Hammond, Jr., Gloucester, Mass.

Application March 13, 1953, Serial No. 342,094

12 Claims. (Cl. 126—214)

The invention relates to cooking stoves and has for an object to provide a stove having a renewable cooking surface.

In accordance with one embodiment of this invention a roll of metallic foil is mounted at the rear of the stove in a position to be pulled across the cooking area of the stove to provide a renewable cooking surface. The foil may be severed from the roll and indented to form a grease receptacle and means are provided to hold the foil in position while it is being used as a cooking surface. After use the foil may be discarded and a new sheet of foil pulled into place.

The invention also consists in certain new and original features of construction and combinations of parts hereinafter set forth and claimed.

Figure 1:
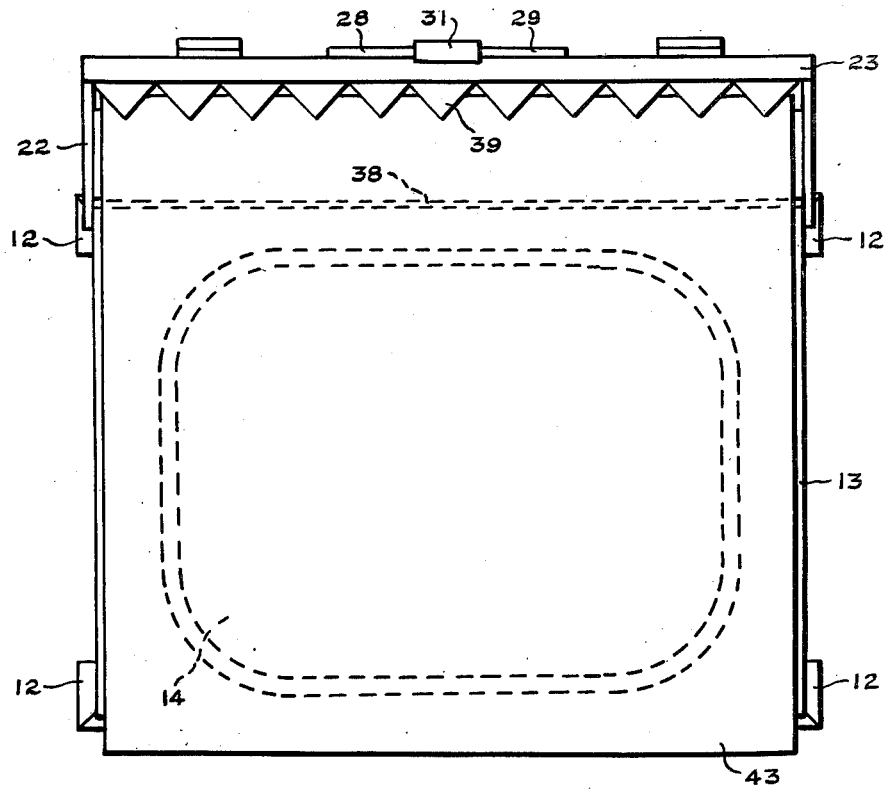
Figure 4:
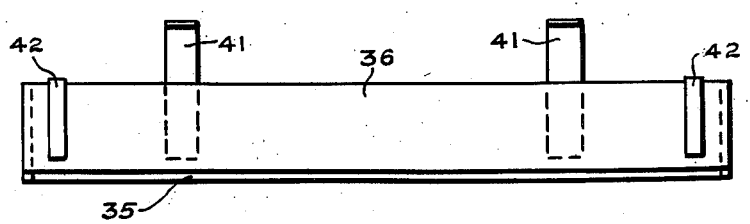
Figure 2:
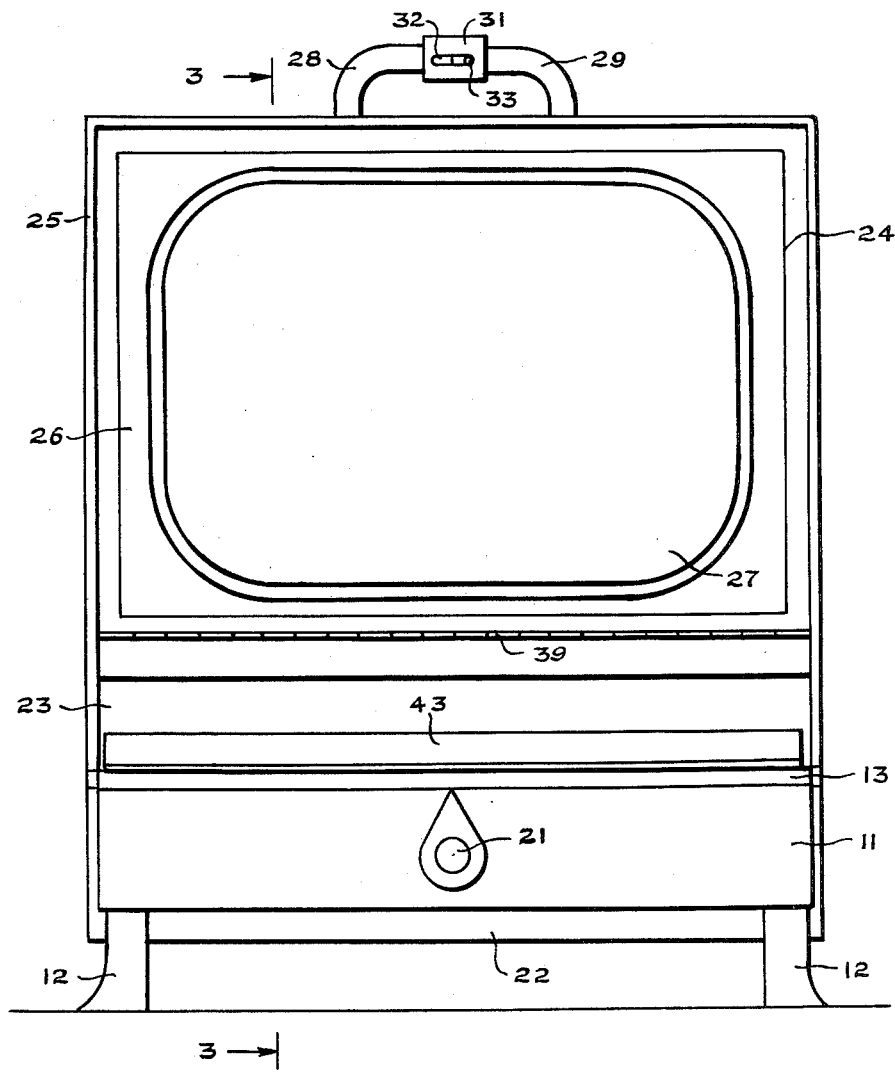
Figure 6:
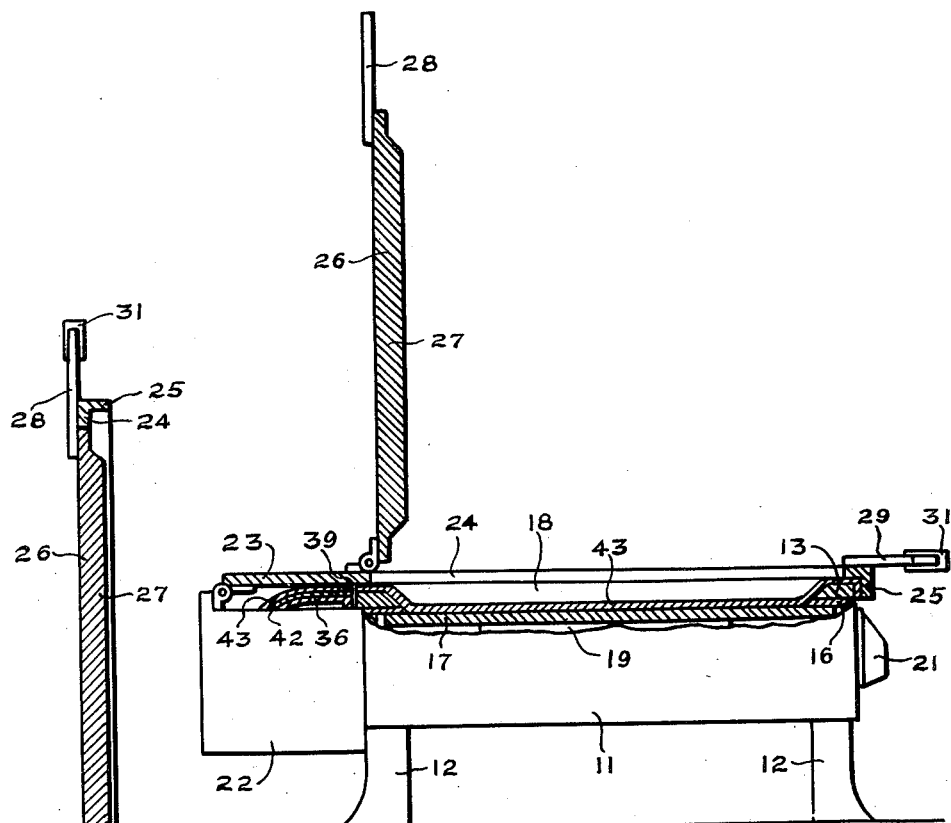
Figure 3:
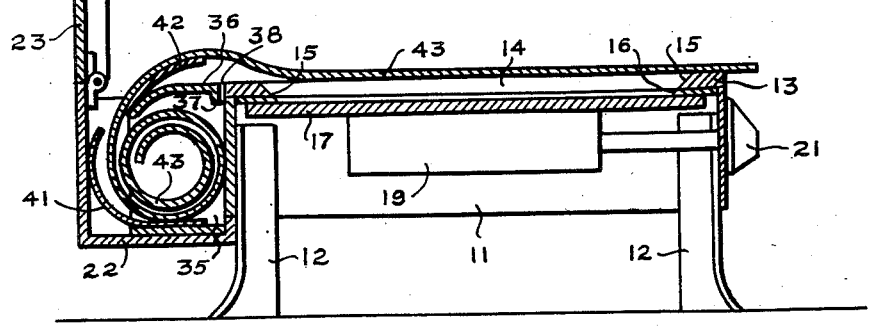
Figure 5:
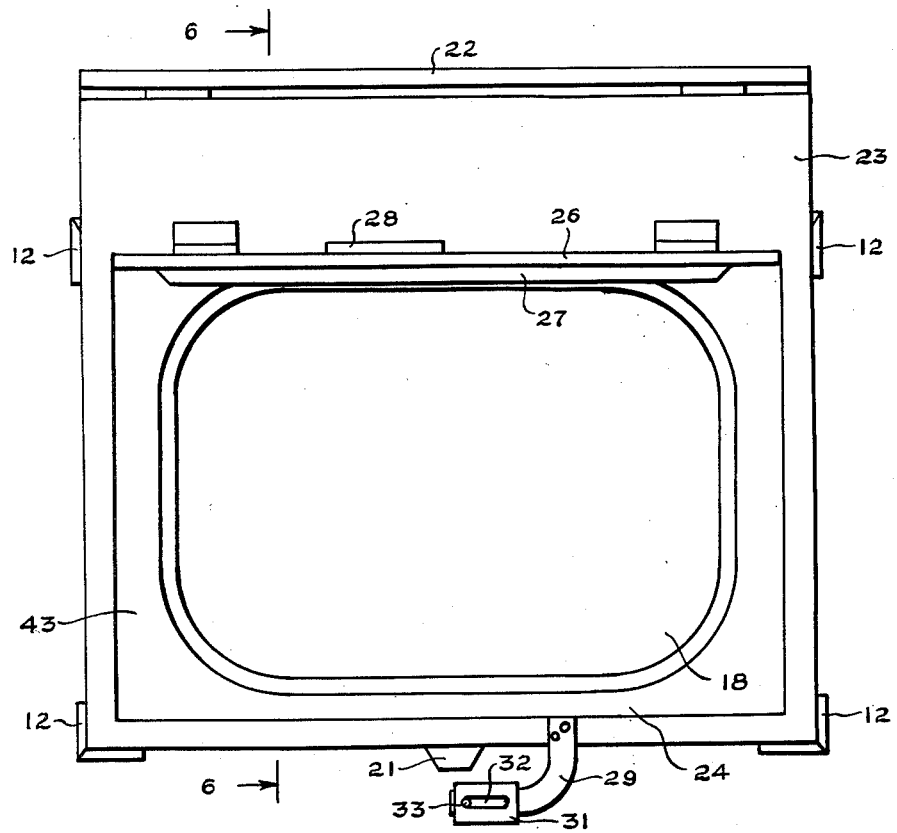
Figure 7:
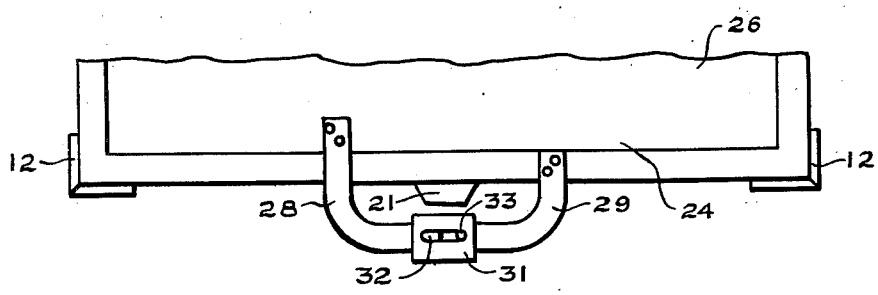

The nature of the invention as to its objects and advantages, the mode of its operation and the manner of its organization, may be better understood by referring to the following description, taken in connection with the accompanying drawings forming a part thereof, in which:

Fig. 1 is a top plan view of a stove constructed in accordance with the invention, Fig. 2 is a front elevation thereof, Fig. 3 is a vertical section taken on line 3—3 of Fig. 2, Fig. 4 is a top plan view of the foil containing receptacle, Fig. 5 is a top plan view of the stove with the inner lid raised, Fig. 6 is a vertical section taken on line 6—6 of Fig. 5, and Fig. 7 is a partial plan view showing both lids in closed position.

Like reference characters denote like parts in the several figures of the drawing.

In the following description parts will be identified by specific names for convenience, but they are intended to be generic in their application to similar parts.

Referring to the accompanying drawings and more particularly to Figs. 1–7 a cabinet 11 is mounted on legs 12. Secured to the top of the cabinet 11 is a rectangular frame 13 having an opening 14 therein, the edges of which are beveled as shown at 15. Secured to the under surface of the frame 13 is a sheet of thermal insulation 16 such as asbestos, which is also provided with an opening the same size as the opening 14. Below this sheet of insulation 16 is a hot plate 17 which is firmly secured to the frame 13 and completely covers the opening 14 thus providing a receptacle 18 about the cooking surface for retaining grease. Mounted on the under surface of the plate 17 is a standard type of electrical heating unit 19 which is controlled by the knob 21 for heating the plate for cooking.

Mounted on the rear of the stove is a rectangular shaped container 22 to the upper rear edge of which is hinged a clamping plate 23 provided with a rectangular opening 24 and turned down edges 25 on three sides thereof. Fitting into the opening 24 is a rectangular cover plate 26, which is provided with a raised portion 27 corresponding to the opening 14 in the plate 13. A handle is provided which is constructed of two curved members 28 and 29. The member 28 is secured to the cover plate 26 and the member 29 to the clamping plate 23. Slidably mounted on the member 29 is a slider 31 which is provided with a slot 32. A pin 33 is secured to the member 29 for limiting the motion of the slider 31.

Located in the container 22 is a foil containing receptacle 35, shown in plan view in Fig. 4, which comprises a base and two sides and a curved top plate 36 provided with a turned down edge 37, thus forming a slot 38 between this edge and the plate 13. A serrated cutting member 39 is attached to the under side of the clamping plate 23 and enters the slot 38 when the clamping plate is closed, as shown in Fig. 6. Fastened to the base of the receptacle 35 are two springs 41 which tend to hold the receptacle in the position shown in Fig. 3. Secured to the curved top late 36 are two light springs 42. Located in the receptacle 35 is a roll of aluminum foil 43 which passes out over the springs 42 and lies flat on the top of plate 13.

*Operation, Figs. 1–7*

When it is desired to use the stove a roll of foil 43 is placed in the receptacle 35 which is then inserted in the container 22 and the foil 43 is pulled into the position shown in Fig. 3. The clamping plate 23 is now pulled down by means of handle 28—29 to cause the raised portion 27 of cover plate 26 to enter the receptacle 18 defined by the hot plate 17 and frame 13, thus conforming the foil 43 to the receptacle. When the clamping plate 23 is pulled down the serrated cutting edge 39 cuts through the foil 43 and enters the slot 38 thus severing that portion of the foil 43 in the receptacle 18 from the roll of foil 43 contained in the receptacle 35. The slider 31 is now moved to the right and the cover plate 26 is lifted by means of handle 28 into the vertical position as shown in Figs. 5 and 6. The main part of the clamping plate 23 remains in the closed position, however, thus securely holding the foil 43 by means of the edges 25.

The stove is now ready for cooking operations which are performed in their usual manner in the receptacle 18 on the surface of the foil 43. When it is desired to have a fresh surface for cooking the clamping plate 23 is lifted into the vertical position and at the same time the cover plate 26 is moved into its initial position in the clamping plate 23 and the slider 33 is moved to the left to secure the two handles 28 and 29 together so that the clamping and cover plates 23 and 26 are in the position shown in Figs. 2 and 3. The used foil 43 is now carefully lifted off the top of the stove in such a way that the grease therein is not spilled and is discarded in a suitable receptacle.

A new sheet of foil 43 is now pulled forward. This operation is facilitated by the springs 42 which hold the edge of the foil 43 above the plate 36 so that it can be easily grasped by the fingers. After the foil 43 has been pulled into the proper position the clamping plate 23 is pulled down and the operation is repeated as already described. The stove is now ready for cooking operation with a new foil surface which may be renewed as often as desired. When it is necessary to put in a new roll of foil the clamping and cover plates 23 and 26 are lifted into their initial vertical position and the receptacle 35 is lifted out of the container 22. A new roll of foil is placed in the receptacle 35, which is replaced in the container 22 and the new foil 43 is pulled into position over the frame 13 as above described.

Although only certain of the various forms in which this invention may be embodied have been shown herein, it is to be understood that the invention is not limited to any specific construction but may be embodied in various forms without departing from the spirit of the invention.

What is claimed is:

1. A cooking stove comprising a cabinet having a supporting means, a hot plate secured in fixed position adjacent the upper end of said cabinet, a rectangular frame secured to the upper surface of said hot plate about the periphery thereof and defining with said hot plate a receptacle open at the upper end thereof, means mounting a supply of sheet metal foil adjacent one side of said receptacle from which mounting means sheet metal foil is adapted to be withdrawn over said receptacle to form a renewable cooking surface, a clamping plate having a rectangular aperture therein conforming to the upper end of said receptacle, said clamping plate being hingedly secured along the rear edge thereof to said supporting means for swinging movement between horizontal and vertical positions in position to clamp the margins of a sheet of metal foil around said receptacle and hold said sheet in place during cooking when said clamping plate is in horizontal position, a cover plate disposed in said aperture and hinged to said clamping plate, said cover plate being provided with a raised portion conforming to the shape of said receptacle by which said sheet of metal foil is conformed to the shape of said receptacle.

2. A cooking stove as defined in claim 1 in which said clamping plate and said cover plate are provided with handles by which said clamping plate and said cover plate are raised and lowered, and in which releasable means are provided for securing said handles together for raising and lowering said clamping plate and said cover plate in unison.

3. A cooking stove as defined in claim 1 in which a cutter is secured to said clamping plate in position to sever sheet metal foil in said receptacle from said supply when said clamping plate is in clamping position.

4. A cooking stove comprising a cabinet having a supporting means, a hot plate provided with grease retaining means secured in fixed position adjacent the upper end of said cabinet, means mounting a supply of sheet metal foil adjacent one side of said hot plate from which mounting means sheet metal foil is adapted to be withdrawn over said hot plate to form a renewable cooking surface, a clamping plate having an enlarged rectangular aperture therein, said clamping plate being hingedly secured along the rear edge thereof to said supporting means for swinging movement between horizontal and vertical positions in position to clamp the margins of a sheet of metal foil disposed over said hot plate and hold said sheet in place during cooking when said clamping plate is in horizontal position, a cover plate disposed in said aperture and hinged to said clamping plate, said cover plate being provided with a raised portion by which a sheet of metal foil disposed over said hot plate is conformed to said hot plate and said grease retaining means when said cover plate is in closed position.

5. A cooking stove as defined in claim 4 in which said clamping plate and said cover plate are provided with handles by which said clamping plate and said cover plate are raised and lowered, and in which releasable means are provided for securing said handles together for raising and lowering said clamping plate and said cover plate in unison.

6. A cooking stove as defined in claim 4 in which a cutter is secured to said clamping plate in position to sever sheet metal foil disposed over said hot plate from said supply when said clamping plate is in clamping position.

7. A cooking stove comprising a cabinet having a supporting means, a hot plate secured in fixed position adjacent the upper end of said cabinet, a rectangular frame secured to the upper surface of said hot plate about the periphery thereof and defining with said hot plate a receptacle open at the upper end thereof, a container constituting a component part of said cabinet disposed adjacent one side of said receptacle, means mounting a supply of metal foil in said container, from which mounting means sheet metal foil is adapted to be withdrawn over said receptacle to form a renewable cooking surface, a clamping plate hingedly secured along the rear edge thereof to said supporting means for swinging movement between horizontal and vertical positions and having a rectangular aperture therein conforming to the upper end of said receptacle, said clamping plate being adapted to cover said container and to clamp the margins of a sheet of metal foil around said receptacle and hold said sheet in place during cooking when said clamping plate is in horizontal position, a cover plate disposed in said aperture and hinged to said clamping plate, said cover plate being provided with a raised portion conforming to the shape of said receptacle by which said sheet of metal foil is conformed to the shape of said receptacle.

8. A cooking stove as defined in claim 7 in which said clamping plate and said cover plate are provided with handles by which said clamping plate and said cover plate are raised and lowered, and in which releasable means are provided for securing said handles together for raising and lowering said clamping plate and said cover plate in unison.

9. A cooking stove as defined in claim 7 in which a cutter is secured to said clamping plate in position to sever sheet metal foil in said receptacle from said supply when said clamping plate is in clamping position.

10. A cooking stove comprising a cabinet having a supporting means, a hot plate provided with grease retaining means secured in fixed position adjacent the upper end of said cabinet, means mounting a supply of sheet metal foil adjacent one side of said hot plate from which mounting means sheet metal foil is adapted to be withdrawn over said hot plate to form a renewable cooking surface, a clamping plate hingedly secured along the rear edge thereof to said supporting means for swinging movement between horizontal and vertical positions and having an enlarged rectangular aperture therein conforming to the upper end of said hot plate, said clamping plate being adapted to cover said mounting means and to clamp the margins of a sheet of metal foil disposed over said hot plate and hold said sheet in place during cooking when said clamping plate is in horizontal position, a cover plate disposed in said aperture and hinged to said clamping plate, said cover plate being provided with a raised portion by which a sheet of metal foil disposed over said hot plate is conformed to said hot plate and said grease retaining means when said cover plate is in closed position.

11. A cooking stove as defined in claim 10 in which said clamping plate and said cover plate are provided with handles by which said clamping plate and said cover plate are raised and lowered, and in which releasable means are provided for securing said handles together for raising and lowering said clamping plate and said cover plate in unison.

12. A cooking stove as defined in claim 10 in which a cutter is secured to said clamping plate in position to sever sheet metal foil disposed over said hot plate from said supply when said clamping plate is in clamping position.

References Cited in the file of this patent

UNITED STATES PATENTS

| | | |
|---|---|---|
| 1,420,808 | Batdorf | June 27, 1922 |
| 2,205,376 | Gottesman | June 18, 1940 |
| 2,225,176 | Lewis | Dec. 17, 1940 |
| 2,236,992 | Broadley | Apr. 1, 1941 |
| 2,452,218 | Bemis | Oct. 26, 1948 |
| 2,507,931 | Pizzonia | May 16, 1950 |
| 2,636,654 | Sykes | Apr. 28, 1953 |
| 2,703,078 | Hammond | Mar. 1, 1955 |

FOREIGN PATENTS

| | | |
|---|---|---|
| 16,125 | Great Britain | June 23, 1910 |